Oct. 7, 1924.

J. M. SULLIVAN 1,511,043

METHOD OF AND MACHINE FOR MAKING PAPER BAGS

Filed July 26, 1922 10 Sheets-Sheet 1

Oct. 7, 1924.

J. M. SULLIVAN

1,511,043

METHOD OF AND MACHINE FOR MAKING PAPER BAGS

Filed July 26, 1922     10 Sheets-Sheet 3

Oct. 7, 1924.
J. M. SULLIVAN
1,511,043
METHOD OF AND MACHINE FOR MAKING PAPER BAGS
Filed July 26, 1922  10 Sheets-Sheet 4

J. M. SULLIVAN 1,511,043

METHOD OF AND MACHINE FOR MAKING PAPER BAGS

Filed July 26, 1922    10 Sheets-Sheet 5

J. M. SULLIVAN 1,511,043

METHOD OF AND MACHINE FOR MAKING PAPER BAGS

Filed July 26, 1921  10 Sheets-Sheet 7

Oct. 7, 1924.

J. M. SULLIVAN

1,511,043

METHOD OF AND MACHINE FOR MAKING PAPER BAGS

Filed July 26, 1922    10 Sheets-Sheet 8

Oct. 7, 1924.  
J. M. SULLIVAN  
1,511,043  
METHOD OF AND MACHINE FOR MAKING PAPER BAGS  
Filed July 26, 1922    10 Sheets-Sheet 9

Oct. 7, 1924. 1,511,043
J. M. SULLIVAN
METHOD OF AND MACHINE FOR MAKING PAPER BAGS
Filed July 26, 1922 10 Sheets-Sheet 10

Patented Oct. 7, 1924.

1,511,043

UNITED STATES PATENT OFFICE.

JAMES M. SULLIVAN, OF CHICAGO, ILLINOIS.

METHOD OF AND MACHINE FOR MAKING PAPER BAGS.

Application filed July 26, 1922. Serial No. 577,495.

*To all whom it may concern:*

Be it known that I, JAMES M. SULLIVAN, a citizen of the United States, residing at Chicago, in the county of Cook and State of Illinois, have invented a certain new and useful Method of and Machine for Making Paper Bags, of which the following is a specification.

The invention pertains to the manufacture of paper bags, and has for its general aim the production of a novel method and machine for completely forming the bags from a continuous sheet of paper, and discharging them in connected end to end relation in which they may be conveniently dispensed simply by severing the bags one at a time from the strip or chain as they are used.

It has heretofore been the practice in the manufacture of paper bags, to arrange them, when the final pasting operation has been completed, in bundles or stacks of a predetermined number each in which form they are supplied to the user.

This manner of supplying paper bags for use has resulted in a great waste, due to the fact that the bags are frequently stacked while the paste is still wet so that they have a tendency to stick together making it difficult for the user to select only one bag from the stack. Consequently the clerks in retail establishments, frequently, in their haste to fill orders, extract two bags instead of one, one of which falls to the floor and is trampled under foot, eventually being swept out and totally wasted.

The primary object of my invention is to make the bags in such a way as to eliminate such waste and at the same time render it possible to select and extract a bag for use, more easily and hence more rapidly.

A further object of the invention is to provide a machine of a relatively simple character whereby the bag making operation may be completely performed with a high degree of efficiency, the operation being rapid and wholly automatic, and entirely without waste.

The objects of the invention thus generally stated, together with other and ancillary advantages are attained by the construction and arrangement illustrated in the accompanying drawings forming part hereof wherein I have illustrated one form of machine only. It is contemplated, however, that various changes in the form, construction and arrangement of the parts may be made by those skilled in the art without departing from the spirit and scope of the invention as expressed in the appended claims.

Figure 1 of the drawing is a fragmentary side elevation of a machine embodying my invention. Fig. 2 is a top plan view of the same. Fig. 2ª is a fragmentary perspective view illustrating the manner of forming the bottom of the bag.

Figure 3:
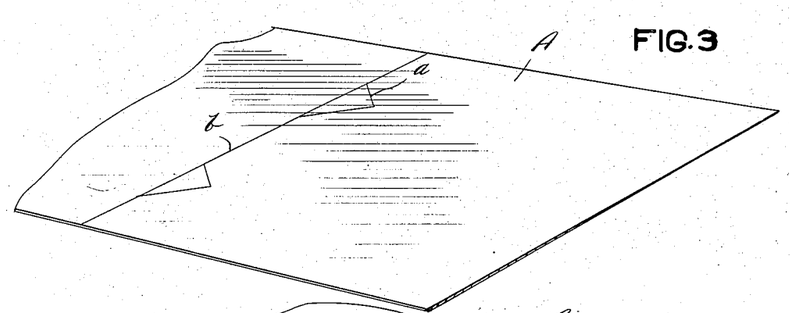
Fig. 3 is a fragmentary perspective view of a portion of the strip of paper from which the bag is to be formed after the initial operation has been performed thereon.
Figure 12:
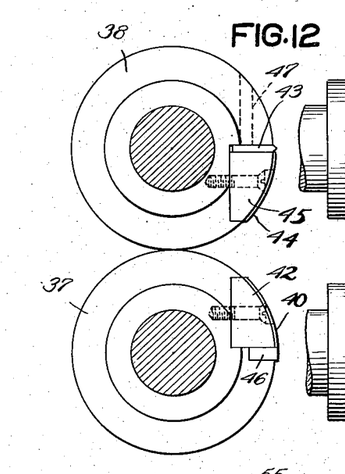
Fig. 12 is a vertical sectional view and Fig. 13 a fragmentary elevational view, illustrating the rolls through which the sheet is initially passed to score the same as shown in Fig. 3.
Figure 13:
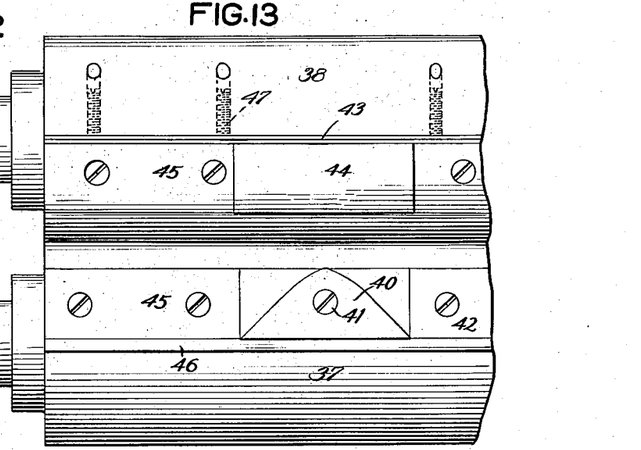

The operation of forming a bag includes the initial scoring of the sheet in the manner illustrated in Fig. 3 to form a pair of spaced triangular creases or scores $a$ and a transverse score $b$ in the sheet A (Figs. 12 and 13); forming bellows folds $c$ in parallel spaced relation (Figs. 9 to 11); cutting a flap $d$ (Figs. 5, 14 and 15); folding back the flap $d$ (Fig. 16); applying adhesive to the sheet upon the underside thereof as shown at $e$ and $f$ (Figs. 5 and 17 to 21 inclusive); folding the sheet into a tubular strip (Figs. 6 and 23 to 26 inclusive); cutting from the tubular strip a flap $g$ (Figs. 7 and 27 to 30); so as to form the upper open end of one bag; applying adhesive $h$ and folding the flaps $d$ and $g$ back upon the strip to form the bottom of the adjacent bag (Figs. 7, 8 and 32 to 35, inclusive), and finally scoring the tubular strip (Figs. 36 to 41) to cause the bags to assume a stacked relation while remaining connected.

Referring now to Figs. 1, 2, 9, 12 and 13, the strip or sheet A is fed from a suitable source of supply, such as a roll B mounted upon suitable standards 36, and passes first beneath a roll 37 and then between the latter and a roll 38 which are suitably journaled at their opposite ends in side frame members 39 of the machine. These rolls (Figs. 12 and 13) perform the initial scoring operation illustrated in Fig. 3 at $a$ and $b$ to facilitate the formation of the triangular portions $a^1$, $a^2$ in the operation of forming the bottom of the bag (Figs. 2ª and 34) as hereinafter more fully described. To this end they comprise suitably shaped forming means. Thus the roll 37 is provided with a pair of triangular plates 40 mounted upon the periphery of the roll in spaced longitudinal relation and secured in position by means of screws 41 between filler plates 42. A bar 43 extending longitudinally of the upper roll 38 constitutes the means for forming the transverse score $b$. The roll 38 is provided with rubber blocks 44 opposite the plates 40 and similarly held in place between filler plates 45; and the roll 37 has a longitudinal rubber strip 46 opposite the bar 43. The latter is adjustably secured in position in the roll by set screws 47. These scores are formed as will hereinafter more fully appear, for the purpose of facilitating the formation of the bottom of the bag into flat form in perpendicular relation to the side and end walls thereof.

Figures 9, 10:
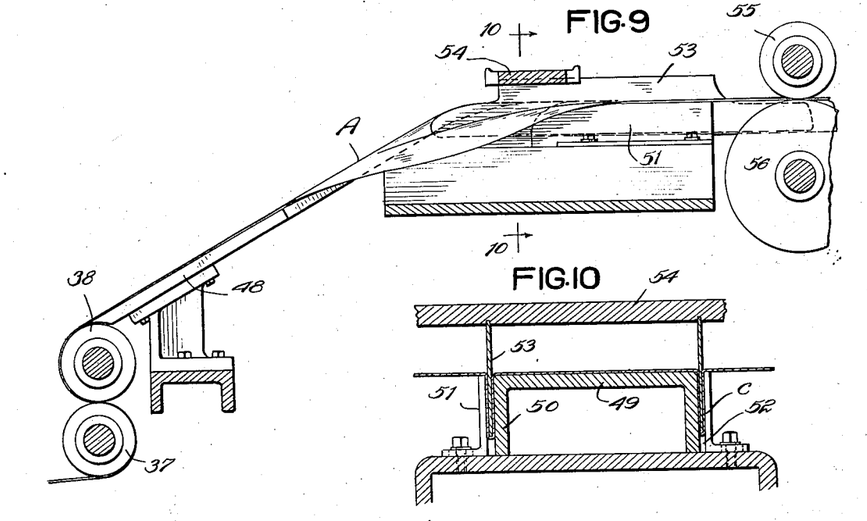
Fig. 9 is a fragmentary longitudinal sectional view taken in the plane of line 9 of Fig. 2 but on an enlarged scale, and illustrating the first and second operations upon the sheet shown in Figs. 3 and 4.
Fig. 10 is a fragmentary transverse sectional view taken in the plane of line 10—10 of Fig. 9.
Figure 11:
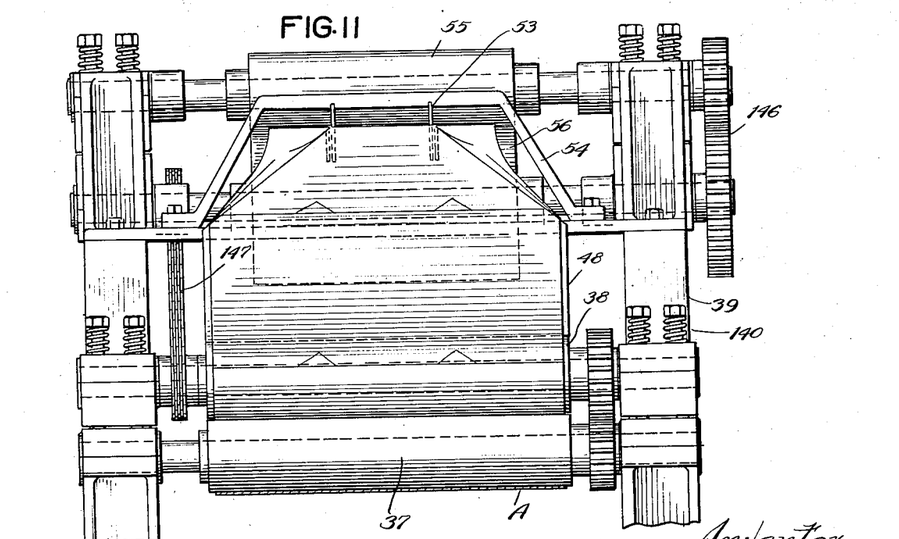
Fig. 11 is a fragmentary end view of the machine.

From the rolls 37 and 38 the sheet passes upwardly and rearwardly over a table 48 (Fig. 9) and from thence into the means for forming the bellows folds $c$ (Figs. 9 to 11). This means comprises a central apron 49 having vertical side walls 50 between which and upright plates 51 are formed grooves 52. Into these latter the paper is guided by means of blades 53 carried by a transverse bridge member 54 suitably supported in the framework of the machine. The folding blades 53 are made of substantial length, extending forwardly to a point between a pair of rollers 55 and 56 of the means for performing the next operation upon the sheet.

Figure 14:
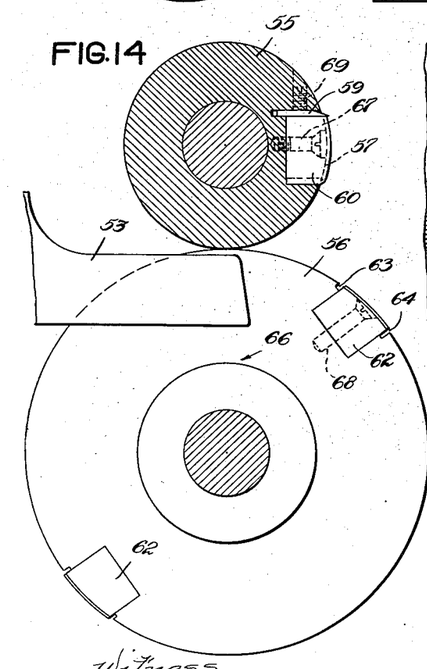
Figs. 14 and 15 are respectively fragmentary vertical sectional and elevational views of the means for performing the third operation illustrated in Fig. 5, Fig. 14 being taken substantially in the plane of line 14 of Fig. 2.
Figure 15:
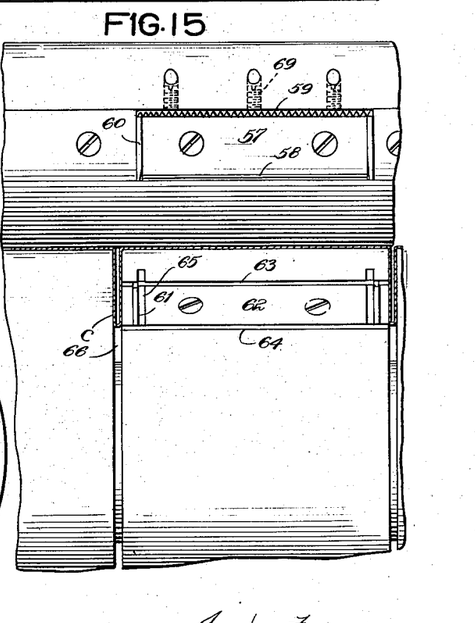

This next operation is that of forming in the sheet the flap $d$, and the means provided for this purpose comprises cutting means mounted upon the peripheries of the rollers 55 and 56 (Figs. 14 and 15). Thus the roller 55 is provided in its periphery midway between its ends with a block 57 having at one longitudinal edge a scoring bar 58 for forming a transverse score *d'* at the base of the flap. At its opposite edge the block has a serrated cutting edge 59, and at the opposite ends of the plate are shearing blades 60 adapted to coact with similar blades 61 mounted in the roll 56 at the opposite end of a block 62. Grooves 63 and 64 are provided at opposite longitudinal edges of the plate 62 for receiving respectively the scoring bar 58 and the cutting edge 59. 65 designates circumferential grooves for receiving the blades 60. For receiving the bellows folds *c* the lower roll 56 is provided with deep peripheral grooves 66. The rear ends of the blades 53 also enter these grooves 66 as shown in Fig. 14. Obviously the blocks 57 and 62 may be secured in position in any suitable way as by means of screws 67 and 68 and the cutting blade 59 is shown as secured in position by set screws 69. The roll 56 is herein made of a diameter twice the size of the roll 55 to accommodate the grooves 66, and therefore the roll 56 is equipped with two cutting blocks 62 and associated parts.

Figure 16:
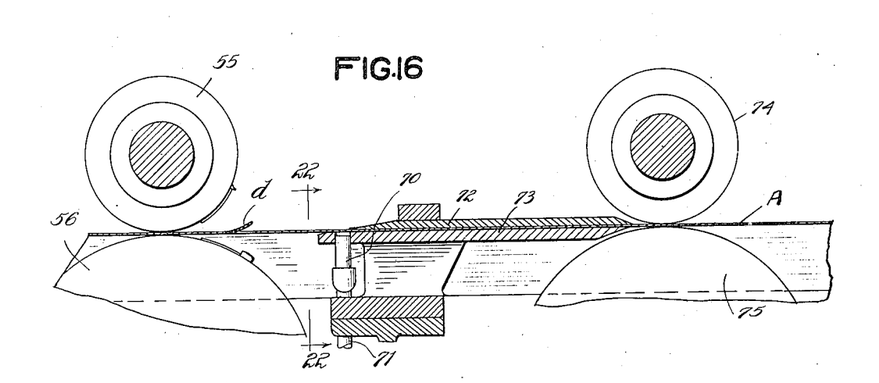
Fig. 16 is a fragmentary vertical longitudinal sectional view taken substantially in the plane of line 16—16 of Fig. 2 illustrating the means for performing the operation shown in Fig. 6.
Figure 17:
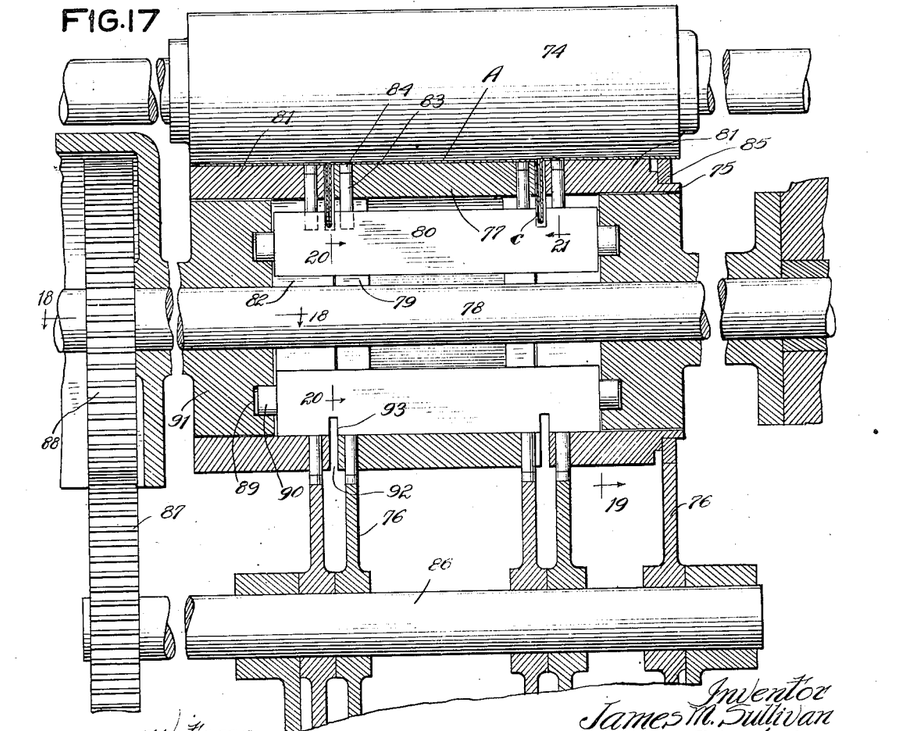
Fig. 17 is a fragmentary vertical transverse sectional view taken substantially in the plane of line 17 of Fig. 2 and illustrating a means for applying adhesive to the strip.
Figure 18:
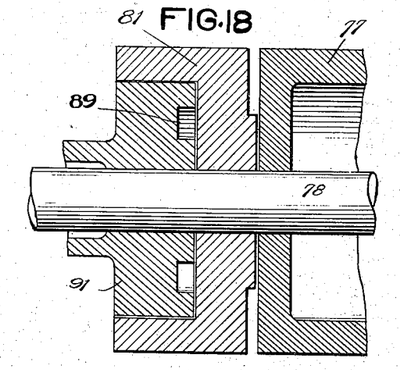
Fig. 18 is a fragmentary transverse sectional view taken in the plane of line 18 of Fig. 17.
Figure 19:
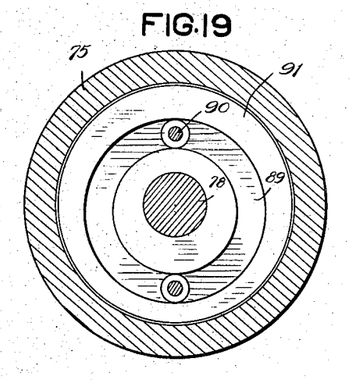
Fig. 19 is a vertical sectional view taken in the plane of line 19 of Fig. 17.
Figure 20:
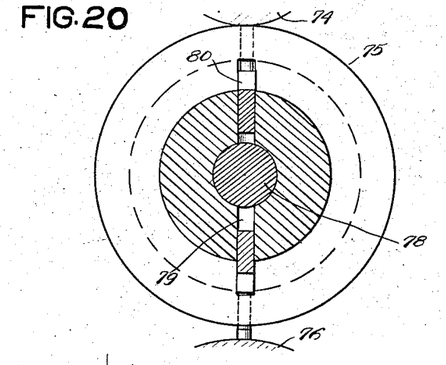
Fig. 20 is a similar view taken in the plane of line 20—20 of Fig. 17.
Figure 21:
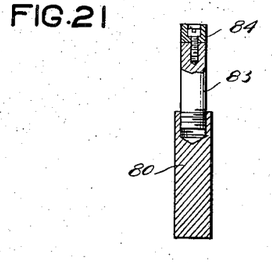
Fig. 21 is a fragmentary detail view through one of the adhesive applying devices, taken in the plane of line 21 of Fig. 17.
Figure 22:
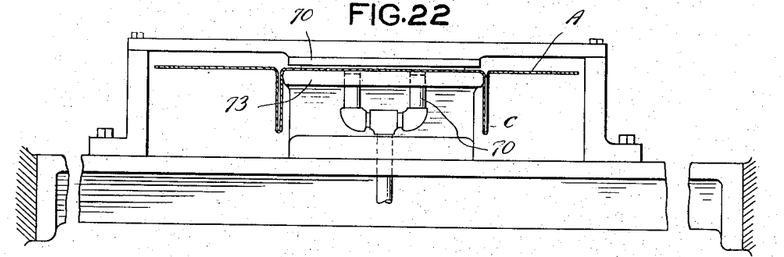
Fig. 22 is a transverse sectional view taken in the plane of line 22—22 of Fig. 16. The means shown in Figs. 17 to 21 inclusive, serve to apply adhesive as shown in broken lines in Fig. 5.

Referring now to Figs. 16 and 22, the flap *d* which has just been formed is now folded back (Fig. 6) in order not to interfere with the progress of the strip through the succeeding mechanisms. The means for accomplishing this result comprises simply a pair of air nozzles 70 to which air is supplied under pressure by way of a pipe 71, from a suitable source of supply (not shown). These nozzles 70 are spaced apart transversely of the sheet and as the flap *d* passes thereover it is elevated and swung upwardly. Thereupon it is immediately passed between a pair of plates 72 and 73 by which it is creased reversely and folded back flat upon the sheet as shown in said Fig. 6.

Upon emerging from between the plates 72 and 73 the sheet passes between adhesive applying mechanism wherein a continuous layer of adhesive *e* is applied to the underside of the sheet at one edge thereof and spots *f* of adhesive are applied to the opposite outer sides of the bellows folds *c*. The means herein employed for this purpose comprises (Figs. 17 to 21 inclusive) a plain upper roll 74 and a built-up lower roll 75 to which adhesive is supplied by means of a plurality of disks 76 operating in a pan of adhesive substance (not shown). The roll 75 may comprise an intermediate cylindrical section 77 fast upon a shaft 78 and slotted in its opposite end walls as at 79 to form radial guideways for a pair of carrier plates 80. At each end of the intermediate section 77 are end sections 81 also fast upon the shaft 78 and having end walls adjacent the opposite ends of the intermediate section which are slotted as at 82 to form radial guideways for the opposite ends of the carrier plates 80. The latter have mounted upon their outer edges a plurality of pins 83 having at their free ends rubber adhesive-carrying fingers 84 which are adapted to engage respectively with the disks 76 in the rotation of the rollers 75. At one end of said roller, I provide a ring 85 carried by one end section 81 and having continuous contact with one of the disks 76. The latter are mounted upon a shaft 86 suitably supported on the framework and connected by gears 87 and 88 to the shaft 78 for rotation thereby.

Rotation is imparted to the roll 75 from the shaft 78, and simultaneously radial movement is transmitted to the carrier plates 80 through the medium of eccentric circular grooves 89 in which trunnions 90 at the opposite ends of the plates operate. Said grooves 89 are formed in the inner faces of stationary heads 91 rigid with the framework, and it will be apparent that as the roll is rotated the eccentric location of these grooves will cause the carrier plates and hence the fingers 84 to move radially, the arrangement being such that when the fingers are in their lowermost position they are extended downwardly into contact with the disks 76 and when in their uppermost position in the roll they are approximately flush with the periphery thereof. This insures that an excessive amount of adhesive will not be applied to the sheet A. Between the sections of the roll I provide radial slots or grooves 92 for receiving the bellows folds *c*, said grooves being extended into the carrier plates 80 as at 93.

Figures 31, 32, 33, 34, 35:
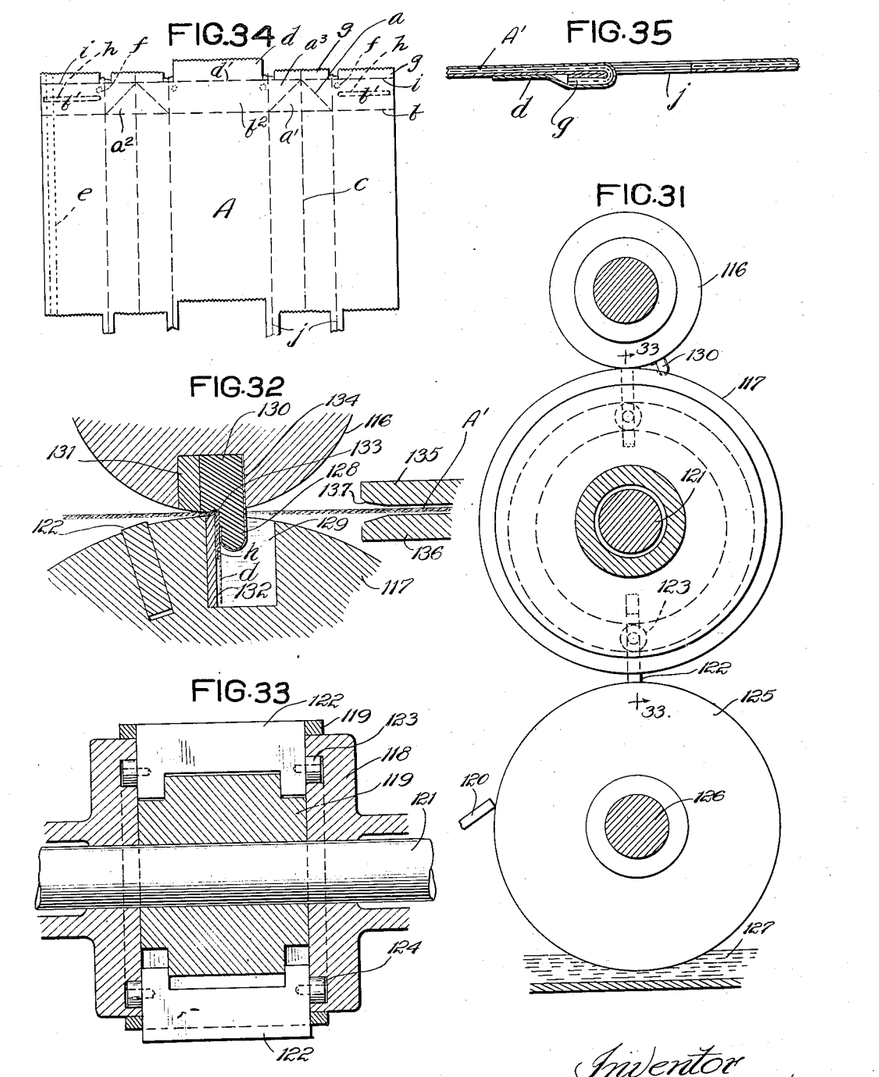
Fig. 31 is a sectional view taken in the plane of line 31 of Fig. 2 and illustrating the means for performing the final folding and pasting operation (Fig. 8).
Fig. 32 is an enlarged sectional detail view of this means.
Fig. 33 is a sectional view taken in the plane of line 33—33 of Fig. 31.
Fig. 34 is a fragmentary plan view of a portion of the strip in flat form to illustrate the various operations performed thereon.
Fig. 35 is a sectional view through the bottom of one bag and the top of a connected bag after the same has been completed.

As in the case of the rolls 55 and 56, the roll 75 is twice the size of the roll 74 and hence is provided with two diametrically opposite sets of adhesive applying devices 83—84; and the arrangement is such that the fingers 84 will apply adhesive to spots *f* and the ring 85 will apply a continuous strip of adhesive to one longitudinal edge of the sheet as at *e* (Fig. 34).

Figures 4, 5, 6, 7, 8:
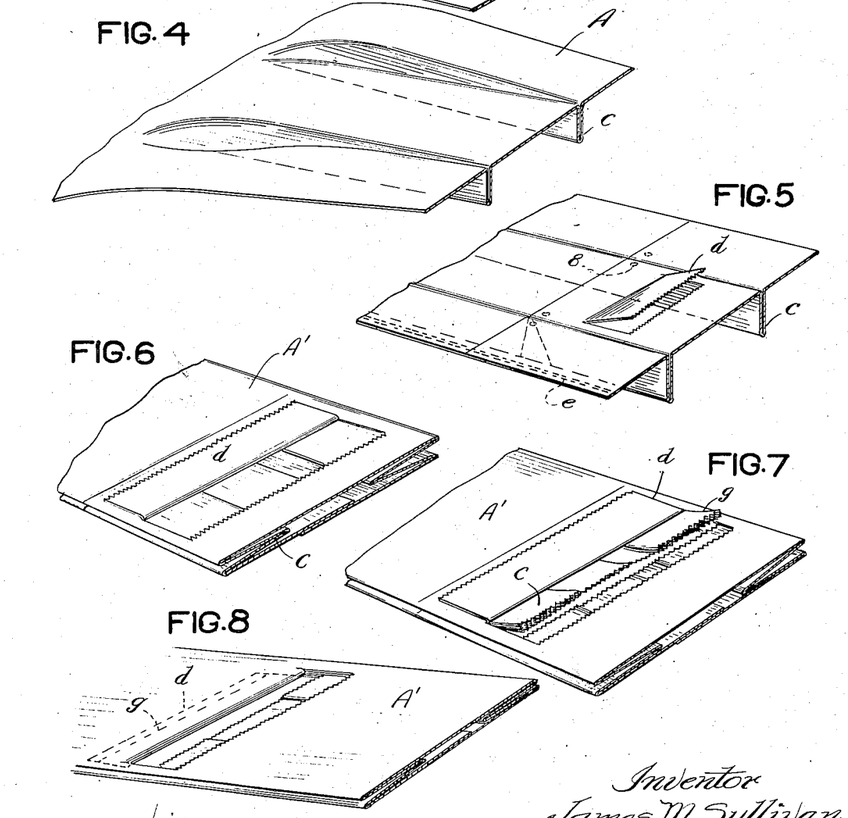
Fig. 4 is a similar view illustrating the manner in which the sheet is folded in the second operation wherein the bellows folds are formed for the opposite end walls of the bag.
Figs. 5, 6, 7 and 8 are fragmentary perspective views illustrating the manner of forming the bottom of the bag.

Upon the application of the adhesive to the sheet, it is folded into a flat tubular strip A', with the bellows folds forming opposite end walls of the tube. The means (Figs. 23 to 26) employed for this purpose, comprises a plate 94 supported by vertical standards 95 (Fig. 25) which latter are provided with vertical grooves 96 for receiving the bellows folds *c* of the strip. Forwardly of the standards 95 I provide a pair of laterally adjustable guide members 97 one at each side edge of the sheet, which are shaped to be engaged by the folds *c* in their forward travel, as well as by the opposite edges of the sheet, so as to turn said folds inwardly and the edges downwardly and inwardly, the latter occupying an overlapping relation (Fig. 6). In the continued movement of the strip it passes downwardly and forwardly through bent fingers 98 carried by a plate 98ª, and thence around a roll 99 and upwardly to the means for cutting the bottom flap in a manner to be presently described.

Figures 23, 24, 25, 26:
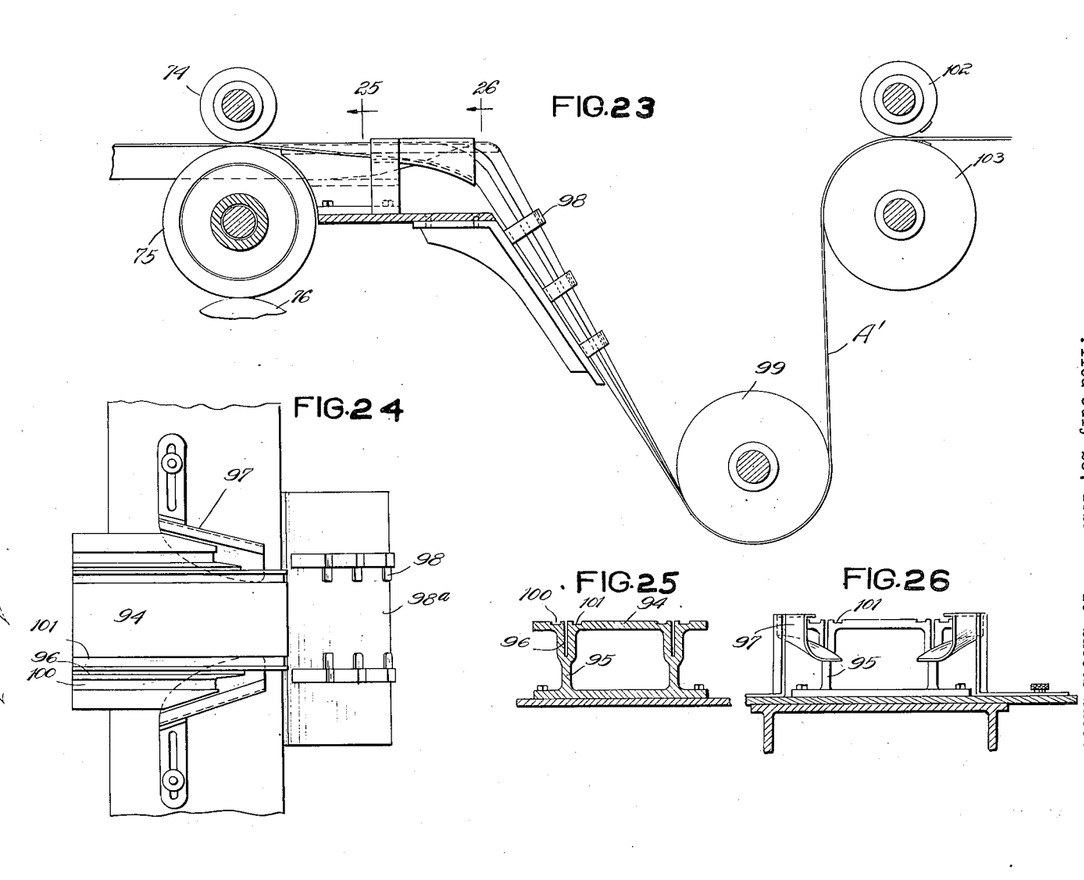
Fig. 23 is a fragmentary longitudinal sectional view taken in the plane of line 23—23 of Fig. 2 and showing the means for folding the strip into tubular form as shown in Fig. 6.
Fig. 24 is a fragmentary plan view of this means.
Figs. 25 and 26 are fragmentary transverse sectional views taken in the plane of lines 25 and 26 respectively of Fig. 23.
Figure 27:
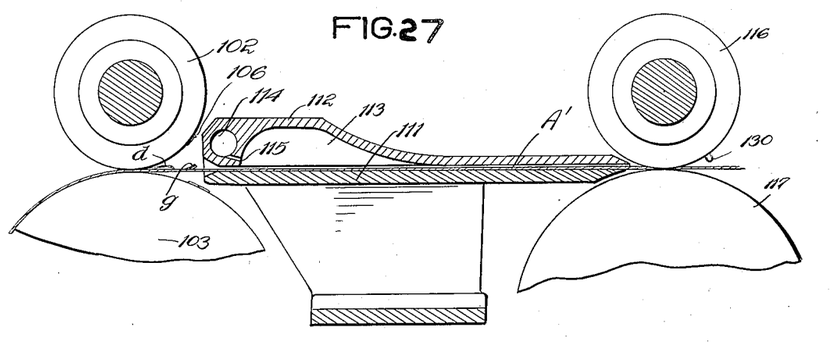
Fig. 27 is a fragmentary longitudinal sectional view taken in the plane of line 27—27 of Fig. 2 and showing a means for performing a cutting and folding operation preliminary to the final operation.
Figure 28:
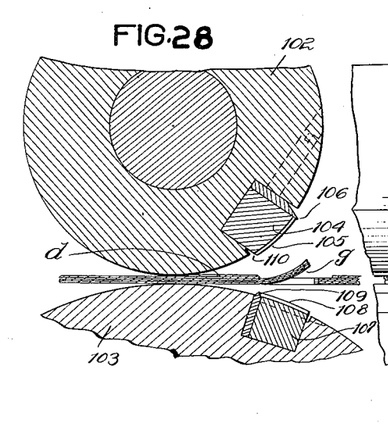
Figs. 28 and 29 are respectively sectional and elevational views of the cutting means referred to in connection with Fig. 27.
Figure 29:
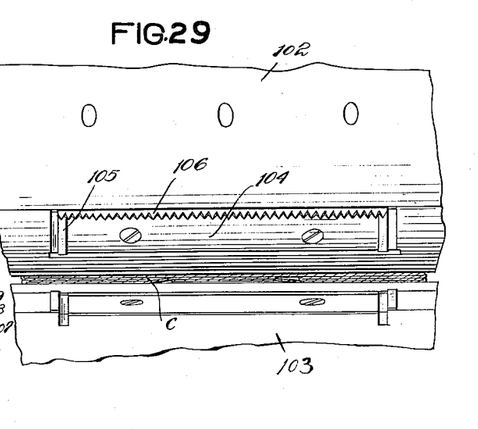

As shown in Fig. 24, the plate 94 is provided near opposite edges with a pair of grooves 100 and 101 so arranged as to be disposed opposite the longitudinal strip e of adhesive and the spots f thereof and thus avoid the deposit of adhesive upon the surface of the table. It will be obvious that the longitudinal strip e of adhesive secures the opposite edges of the sheet together in overlapping relation to form a sealed tube; and the spots f of adhesive are applied upon the opposite sides of each of the bellows folds at the bottom of the bag so as to secure firmly the bottoms and end walls of the bag together.

Referring now to Figs. 27 to 30, inclusive, the tubular strip A' now passes between a pair of rolls 102 and 103 having devices for cutting the tube to complete the formation of the upper open end of one bag and to enable the sealing of the bottom of the adjacent bag. To this end the upper roll 102 carries a block 104 having at its opposite ends a pair of blades 105 and at one longitudinal edge a serrated cutting edge 106. The roll 103 has a block 107 therein providing at its opposite ends cutting blades 108 adapted to coact with the blades 105, and at one longitudinal edge with a blade 109 adapted to enter a groove 110 adjacent the block 104 to form a transverse score i in the sheet, suitable grooves being provided in the peripheries of the rolls for the purpose of accommodating the blades 105, 106 and 108. The flap g which is thus formed is cut through the side wall of the tubular strip opposite the wall containing the flap d, and includes portions of the bellows folds c; but it is made of a width somewhat less than the width of the flap d so that one side wall of each bag at its upper end is made of a length slightly less than the other wall to facilitate the opening of the bag. Both of the flaps d and g are of a length somewhat less than the width of the tubular strip so that links j are formed at opposite edges thereof serving to connect the bags in end to end relation.

Figure 30:
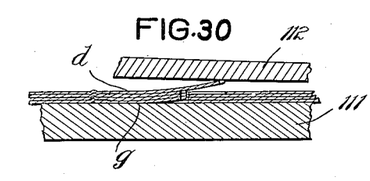
Fig. 30 is a sectional detail view of the folding means referred to in connection with Fig. 27.

From the rolls 102 and 103 the strip passes between plates 111 and 112 for the purpose of turning the flap d forwardly over the flap g. To this end the plate 112 is shaped to provide an enlargement at its forward end in which is formed a chamber 113 above the surface of the bag. Air under pressure is supplied to said chamber through a passage 114 communicating with a suitable source of air supply and discharging by way of a jet 115 into the rear end of the chamber. The jet 115 is arranged adjacent the upper surface of the sheet, and it will be obvious that the pressure of the air will turn the flap d forwardly, holding it and the flap g in a forwardly and upwardly inclined position. The rear wall of the chamber 113 is inclined downwardly and forwardly so that as the sheet passes from the chamber, the flap d engaging with said inclined wall is forced downwardly as illustrated in Fig. 30. The flaps are then positively forced downwardly flat upon the sheet by the rear ends of the plates 111 and 112 which at this point are spaced apart just sufficiently to provide a passage for the sheet.

From the rear ends of the plates 111 and 112 the strip is operated upon to fasten the flaps d and g to one of the side walls thereof to form the bottom of the bag. In this operation it passes first between rollers 116 and 117 (Figs. 31 to 33) carrying mechanism for applying a quantity of adhesive to the under side of the sheet, transversely thereof, and for folding the flaps downwardly, and finally between pressure exerting means to render the adhesive effectual.

The adhesive-applying means is mounted in the lower roll 117, which consists of stationary end pieces 118 rigid with the framework. A drum 119 fast upon a rotating shaft 121 is radially slotted to receive diametrically opposite blades 122. These blades are provided with roller trunnions 123 at each side edge operating in cam grooves 124 in the inner faces of the end pieces 118.

The arrangement is such that in their lowermost position the blades contact with a roll 125 mounted upon a rotating shaft 126 and immersed at its lower edge in a bath of adhesive 127; and when the blades approach their uppermost position their outer edges lie approximately flush with the periphery of the drum 119 in which position the blades contact the under side of the sheet passing between the rolls 116 and 117, and deposit a quantity of adhesive upon the sheet in a position such as to be covered by the end of the flap d, as indicated at h (Fig. 34). 120 indicates a wiper blade for the roll 125.

The means for turning the flaps d and g downwardly consists of a finger 128 mounted in the roller 116 so as to project radially therefrom, a recess 129 being provided in the periphery of the roll 117 to receive this finger. The latter is preferably formed of rubber, upon a block 130 inserted in a suitable slot in the roll 116 and held in place by a filler block 131. One wall of the recess 129 has a plate 132 thereon with a sharpened edge protruding slightly from the periphery of the drum and adapted to coact with a shoulder 133 at the base of the finger 128 to form the transverse score i at the base of the flap g. As shown in Fig. 32, the parts are so arranged that as the flaps d and g pass between the rollers 116 and 117, the finger 128 forces them downwardly into the recess 129, at the same time forming the transverse score i so that the flaps will retain their downward position as the sheet emerges from between the rolls. In order that the rubber finger 128 may not grip the paper, it is preferably faced with a metallic strip 134.

The next operation is that of forcing the flaps rearwardly and upwardly into engagement with the underside of the tubular strip, which it will be remembered has been coated with a transverse coat of adhesive h, and thus to complete the bag. This means comprises simply a pair of plates 135 and 136 spaced apart vertically so as to receive between them the tubular strip, the forward ends of the plates being cut away at their adjacent surfaces as at 137 so as to insure the passage therebetween of the flaps bent back upon the strip.

From between the plates 135 and 136 the strip passes between rollers 138 and 139 whereby the final sealing of the bottom of the bag by the adhesive is effected under pressure.

It will, of course, be understood that the various rolls may be mounted in the framework of the machine in any suitable or preferred manner and that power may be applied thereto to effect their rotation in the proper direction and at the desired speed through the medium of gearing such as is commonly employed in machines of this character. Herein the rolls 37 and 38, 55 and 56, 74 and 75, 102 and 103, 116 and 117 and 138 and 139, between which the sheet or strip passes are relatively mounted so that a yielding pressure is exerted upon the sheet through the medium of springs 140 acting upon the bearing boxes for the upper rolls. Power is applied by means of a pulley 141 fast upon a shaft 142 and driving a spur gear 143. The latter meshes with a gear 144 which is rigid with a gear 145 connected in a chain of gears 146 with which the rolls are operatively associated. The rolls 37 and 38 are driven by means of a chain and sprocket mechanism 147 from said chain of gears 146.

Figures 37, 38, 40, 41:
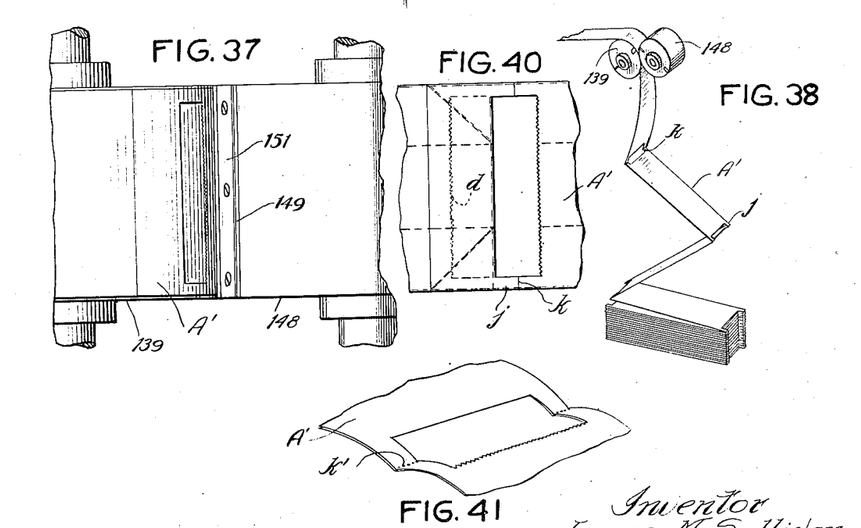
Fig. 37 is a fragmentary plan view of the scoring means shown in Fig. 36.
Fig. 38 is a perspective view illustrating the manner in which said scoring means act to cause the bags to assume a stacked form.
Fig. 40 is a fragmentary plan view of the tubular strip after the same has been scored.
Fig. 41 is a fragmentary perspective view of the strip scored by the device shown in Fig. 39.

It will be understood that the machine operates continuously as the sheet A is fed into the same, so that it is in fact operating simultaneously upon a plurality of bags, which are discharged from the machine in rapid succession but in chain form, that is, in connected end to end relation by the links j (Fig. 38).

Summary of operation: In order that the bags when thus discharged from between the rolls 138 and 139 shall automatically assume a stacked relation, I provide a roll 148 coacting with the roll 139 to deflect the strip downwardly, these rolls being provided with scoring devices to cause the bags to fall one on top of the other to produce a stack.

Figures 36, 39:
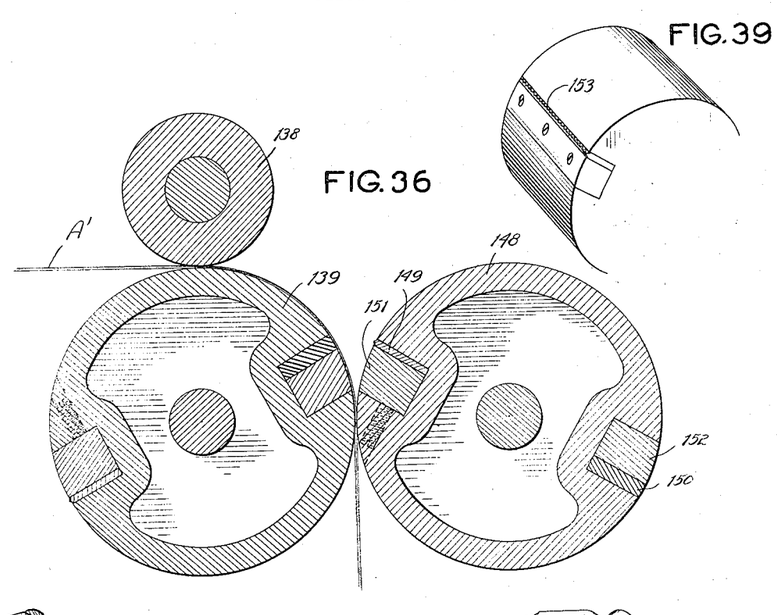
Fig. 36 is a sectional view taken in the plane of line 36 of Fig. 2 and illustrating a final scoring operation.
Fig. 39 is a fragmentary perspective view of a modified form of scoring device.

Referring to Figs. 36 to 38, these scoring devices consist of a metallic bar 149 one in each of the rolls 139 and 148 and opposed rubber strips 150, the bars and strips being suitably secured in position by filler blocks 151 and 152. Preferably the arrangement is such that in the passage of the tubular strip between the rolls 139 and 148 transverse scores k are formed in the connecting links j, but it will be understood that this score may be otherwise located if desired. Obviously, since the successive scoring operations are performed by the bars 149 in opposite rolls, the strip is scored first in one direction and then in the other so as to cause the bags to fall in opposite directions one upon the other while remaining connected together. In this form, the bags may be conveniently placed in a dispensing device (not shown).

By the use of the scoring device 153 shown in Fig. 39 a perforated score $k'$ (Fig. 41) is produced which increases the facility with which the bags may be severed one from the other.

Referring now to Fig. 34, I have shown the sheet in unfolded or flat form after all of the operations have been performed thereon. Initially the sheet passes between the rollers 37 and 38 wherein the triangular scores a and the transverse score b are formed. Next it passes over the apron 49 and portions upon each side of its center are guided by means of blades 53 into grooves 52 upon each side of the apron to form the bellows folds c. These folds are indicated by three broken lines in said Figure 34, and it will be observed that the bottom of the fold (the central line) coincides with the apex of one of the triangular scores a, the portion of the sheet forming the folds being of a width equal to the base of the triangle formed by the score a. These folds c, as in the case of former bags, constitute opposite end walls of the bag, and the triangular portions defined by the scores a become a part of the bottom of the bag as will presently more fully appear.

In the continued passage of the sheet through the machine the flaps d are cut by means carried by the rollers 55 and 56, and in passing between the plates 72 and 73 said flap is folded back upon the sheet for convenient passage through succeeding operations. Adhesive is now applied to the sheet through the medium of the fingers 84 carried by the roll 75, along one edge of the sheet upon the underside thereof, as indicated at e and also at spots f.

The next operation is that of folding the sheet into tubular form as indicated in Fig. 6 and this is accomplished by the guide plates 97 and fingers 98, the opposite edges of the sheet being overlapped and made fast by the strip of adhesive $e$.

The operation of forming the bottom is now performed by cutting the flap $g$. Referring to Fig. 7 this flap, by the operation of cutting devices on the rolls 102 and 103, is made of a length such that it includes the major portions of the bellows folds $c$, but leaves at the outer edges thereof portions forming parts of the connecting links $j$ (Fig. 35). The other part of each link is formed by portions left in the operation of cutting the flap $d$.

From the rollers 102 and 103 the tubular strip passes between the plates 112 and 111 into the air chamber 113 wherein the flap $d$ is moved rearwardly (Fig. 30), and thence the strip passes between the rolls 116 and 117 and the flaps $d$ and $g$ are engaged by the finger 128, forced downwardly through the opening provided in the cutting operation, and adhesive is applied by blades 122 in the form of a transverse strip or coat $h$ rearwardly of the flap but on the underside of the strip. The latter now passes between plates 134 and 135, bending the flaps upwardly and rearwardly along the score $i$, and finally the strip passes between pressure rolls 138 and 139 and between the latter roll and the roll 148 by which it is given a downward direction and is oppositely scored as at $k$ (Fig. 40) to insure the stacking of the bags.

Figures 1, 2, 2A:
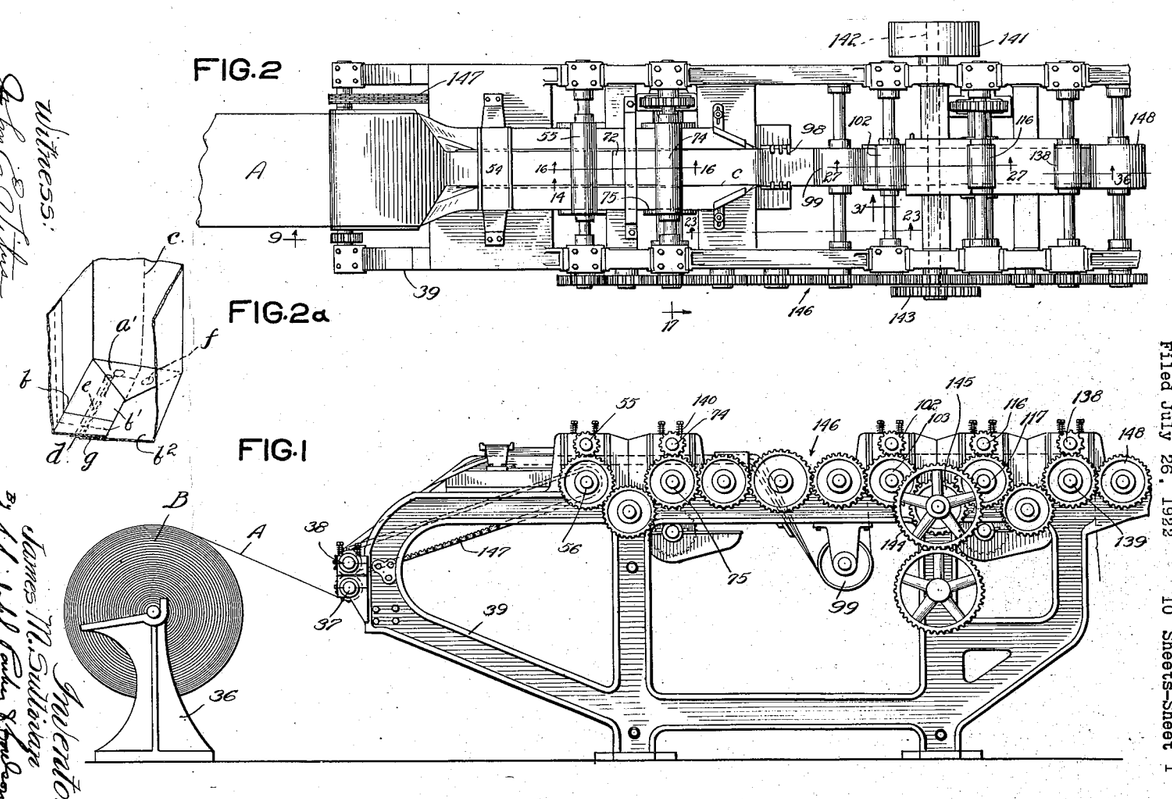

The bottom of the bag (Fig. 2ª) when the latter is open, is defined by the score $b$ (Fig. 34) and is formed by end portions $b'$ $b^2$ and $a'$ $a^2$, the portions $b'$ and $b^2$ being formed respectively integral with the opposite sides of the tubular strip, and the portions $a'$ and $a^2$ being integral with the opposite end walls of the strip. The portions $b'$ and $b^2$ are secured together by the flaps $d$ and $g$ folded back and pasted to the underside of the strip, and the triangular portions $a'$ are tucked or folded inwardly so as to overlie the portions $b'$ and $b^2$, when the latter assume a flat form, as permitted by the portions $a^3$, the latter being made fast to the portions $b'$ and $b^2$ by adhesive applied at $f$. For a more complete understanding of the construction of the bag itself, reference is made to my prior Patent No. 1,279,171, dated September 17, 1918.

The machine which I have produced for making the bag is relatively simple in construction and effectual in operation. Not only does it form the tubular portion of the bag but operates entirely automatically to complete the bag, forming the bottom thereof as well. By reason of the fact that they are connected together in end to end relation in the form of a chain they lend themselves readily to economical dispensing, and the construction of the bag is such that they may be readily opened.

I believe that I am the first to have made paper bags from a tubular strip by providing flaps in opposed side walls of the strip and securing them together preferably against one side of the strip to conceal the bottom of the bag. The mechanisms employed as hereinbefore set forth for accomplishing this result are covered in the appended claims, but I wish to point out that it is not to be implied from the order of recitation of the elements in the claims that the several mechanisms referred to operate in such order or sequence, or that any particular order or sequence is intended to be specified; for while I have shown one embodiment in which a definite sequence of operations obtains, it will be obvious that numerous possible variations will occur to those skilled in the art.

I claim as my invention:

1. A paper bag machine having, in combination, means for folding a sheet into a flat tubular strip, means providing an opening in one wall of the strip, and means for folding a previously formed flap in the other wall of the strip through said opening.

2. A machine for making bags of paper or other suitable material having means for folding the material to form a tubular strip, means providing a flap and an opening in the material arranged to lie oppositely in opposed side walls of the strip, and means for folding the flap through the opening.

3. A paper bag machine having, in combination, means for scoring a sheet, folding means and flap cutting means, said means being arranged to operate in some predetermined sequence to provide a tubular strip having a flap in one wall and an opening in an opposite wall; and means for folding said flap through said opening and into engagement with said opposite side wall.

4. A paper bag machine having, in combination, folding means and cutting means arranged to operate in some predetermined sequence upon a sheet to provide a tubular strip having a flap in one wall and an opening in an opposite wall whereby said flap may be passed through said opening and secured to the opposite wall.

5. A paper bag machine having, in combination, folding means and cutting means arranged to operate in a predetermined sequence to provide a tubular strip having a flap in one wall and an opening in an opposite wall; and means for applying adhesive to the sheet whereby when the same is folded into a strip the opposite edges of the sheet are secured together.

6. A paper bag machine having, in combination, means for folding a sheet, and flap cutting means, said means being arranged to operate in a predetermined sequence to provide a tubular strip having a flap in one wall; and means operating to force the flap through the opening formed thereby and secure it to the opposite wall of the strip.

7. A paper bag machine having, in combination, means for folding a sheet, and flap cutting means, said means being arranged to operate in a predetermined sequence to provide a tubular strip having a flap in one wall; and means for securing said flap to the opposite wall of the strip including means operable to form an opening in said opposite wall in register with the opening formed by said flap, and means for forcing said flap through said opening whereby the flap may be secured to the opposite wall.

8. In a paper bag machine the combination of means for feeding a continuous sheet including a pair of rolls having scoring means thereon, means forming a pair of spaced folds in the sheet, a pair of rolls having means for forming a flap in the sheet centrally thereof, said flap being formed to swing on a line transversely of the sheet, means folding the sheet into a tubular strip, means forming a second flap of a width less than the first mentioned flap and swingable on a line coinciding with that of the first mentioned flap, and means for turning the flaps back upon the strip.

9. A paper bag machine having means for scoring a sheet to provide a transverse score and a pair of triangular scores adjacent the transverse score, folding means and cutting means arranged to operate in a predetermined sequence to form a tubular strip with opposed bellows-folds and having a flap in one wall and an opening in an opposite wall through which the flap is adapted to be passed, and means for fastening the flap to the opposite wall.

10. A paper bag machine having, in combination, folding means and cutting means operable in a predetermined sequence to provide a tubular strip having opposite bellows-folds and a flap in one wall of the strip of a length less than the width of said wall, and means for fastening the flap to an opposite wall of the strip.

11. A paper bag machine having, in combination, folding means and cutting means arranged to operate in a predetermined sequence to provide a tubular strip having a flap in one wall and an alined opening in the opposite wall, and means for tucking the flap through said opening, said flap being of a length less than the width of the wall in which it is formed.

12. A paper bag machine having means for feeding a continuous strip of paper, rollers having means for scoring the sheet transversely thereof, an apron over which the sheet is arranged to pass and having grooves at opposite sides thereof, blades in said grooves for folding the sheet to form spaced parallel folds therein, means engaging the opposite side edges of the sheet and forming it into a tubular strip, and means operating at some time during the operation to provide flaps in the opposite side walls of the strip for securing them together and thereby forming the bottom of the bag.

13. A paper bag machine having a pair of rolls between which a sheet of paper is arranged to pass, and means carried by said rolls for scoring the sheet including devices arranged in spaced relation longitudinally of the roll so as to produce a pair of laterally spaced angular scores in the sheet, and a scoring bar located in the opposite roll so as to produce a transverse score at the bases of the angular scores.

14. A paper bag machine having a pair of rolls between which a sheet of paper is arranged to pass, said rolls having means forming a flap therein including a plate extending longitudinally of one of said rolls, cutting blades at the opposite ends of the plate and along one longitudinal edge thereof, and a scoring blade along the opposite longitudinal edge of the plate.

15. A bag machine having a pair of rolls between which a sheet of paper is arranged to pass, one of said rolls having upon its periphery a pair of longitudinally spaced cutting blades and a pair of circumferentially spaced cutting and scoring blades, and the other one of said rolls having a pair of spaced blades adapted to coact with the blades of the first mentioned roll, and grooves for receiving the cutting and scoring bars and blades of the first mentioned roll.

16. A paper bag machine having means for scoring a sheet transversely thereof, folding means and cutting means operable to provide a tubular strip having a flap in one wall hinged along a line parallel to said transverse score and spaced therefrom a distance of one-half the width of the bottom wall to be formed.

17. A paper bag machine having a pair of rolls between which a sheet of paper is arranged to pass, means cutting a flap in the sheet hinged to swing on a transverse line, and means for folding the flap back upon the sheet including a pair of spaced guide plates, and means independent of the cutting means for lifting the flap prior to its passage between said plates.

18. A paper bag machine having a pair of rolls between which a sheet of paper is arranged to pass, means cutting a flap in the sheet hinged to swing on a transverse line, means for folding the flap back upon the sheet including a pair of spaced guide plates, and pneumatic means for lifting the flap prior to its passage between said plates.

19. A paper bag machine having, in combination, means operable to score a sheet transversely thereof, means operable to fold the sheet longitudinally thereof, means for cutting the sheet transversely thereof, and adhesive applying means, the several means being arranged to operate in a predetermined sequence to provide a tubular strip having bellows-folds in opposite end walls, a transverse flap in one side wall thereof near said transverse score, and an alined opening in the opposite side wall through which said flap is adapted to be passed and secured in position upon said opposite wall by adhesive applied by said adhesive applying means.

20. A paper bag machine having a pair of rolls between which a sheet of paper is arranged to pass, said sheet having a pair of spaced parallel folds therein, one of said rolls having grooves for receiving said folds, and means for applying adhesive to one surface of the sheet comprising a blade having adhesive applying fingers thereon movable from an extended relation in contact with adhesive supplying means into a retracted adhesive-applying position.

21. A paper bag machine having, in combination, scoring means, folding means and cutting means, the several means being arranged to operate in a predetermined sequence to provide laterally spaced triangular scores in the sheet with longitudinal folds alined with the apices of said triangular scores and the sheet formed into a tubular strip to provide opposed side walls, the longitudinal folds providing opposed end walls, said cutting means providing a pair of flaps in the opposite side walls swingable on a transverse line approximately touching the apices of said triangular scores and adapted to be secured together to form the bottom of the bag.

22. A paper bag machine having means operating upon a sheet to produce bellows-folds, means for forming said sheet into a tube, means opearting at some time for cutting flaps in the sheet at opposite sides of said tube, and means for folding one of said flaps through the opening formed by the other flap.

23. A paper bag machine having, in combination, folding means and cutting means arranged to operate in a predetermined sequence to provide a tubular strip having a flap in one wall and an opening in an opposite wall, and means for tucking said flap through said opening, the operation of forming said flap and said opening serving also to produce the open end of an adjacent bag.

24. A paper bag machine having, in combination, folding means and cutting means operable to provide a tubular strip having flaps in opposed walls with the openings formed by the flaps in alinement, one of said flaps being of greater width than the other, and means for folding the flaps into engagement with one side wall of the strip, the flap of greatest width being folded over the other flap.

25. A paper bag machine having folding means, cutting means and pasting means, operable in a predetermined order to produce a tubular strip having opposed end walls in the form of bellows-folds and a pair of transverse flaps in opposite side walls swingable substantially on the same axis, said pasting means operating to apply adhesive so as to secure the extreme lower ends of the bellows-folds to the adjoining side walls of the strip and to secure said flaps together.

26. A paper bag machine having folding means and flap cutting means operable in a predetermined sequence to produce a tubular strip having a flap in one wall, said cutting means including a pair of rolls, cutting blades carried by one of said rolls for severing one side edge at opposite ends of the flap, and a bar carried by the other roll for scoring the flap along its opposite side edge to form a hinge therefor.

27. A paper bag machine having a pair of rolls between which a sheet of paper is arranged to pass, said sheet having a pair of spaced parallel folds therein one of said rolls having grooves for receiving said folds, and means for applying adhesive to one side of the sheet near one edge thereof comprising an adhesive applying ring on one of said rolls having continuous contact with the paper.

28. A paper bag machine having means forming a flap in a sheet to swing on an axis transversely thereof, means folding the sheet into a tubular strip, and means forming a second flap in the strip in the opposite side wall thereof through the opening formed by the first flap.

29. A paper bag machine having folding and cutting means operable upon a sheet to produce a tubular strip having a flap in one wall thereof and an alined opening in the opposite wall, means for tucking the flap through the opening formed thereby and through the opening in the opposite wall, and means for folding the flap against said opposite wall of the strip.

30. A bag machine having means forming a flap in a sheet, means turning said flap back upon the sheet, means folding the sheet into a tubular strip, and means forming a second flap in the strip through the opening formed in the making of the first flap.

31. A bag machine having means forming a flap in a sheet, means turning said flap back upon the sheet, means folding the sheet into a tubular strip, means forming a second flap in the strip through the opening formed in the making of the first flap, means for returning the first flap to its initial position, and means for folding both flaps against one wall of the strip and securing them thereto.

32. A bag machine having means for forming a flap in a tubular strip transversely thereof including a pair of rolls, cutting blades carried by one of said rolls for severing one side edge and opposite ends of the flap, and a bar carried by the other roll for scoring the flap along its opposite side edge to form a hinge therefor.

33. A bag machine having means forming a flap transversely of a tubular strip, a pair of rolls, means for guiding the strip between said rolls including means for holding the flap in its initial position, and means for forcing the flap through the opening formed thereby and securing it to one side wall of the strip to form the bottom of the bag.

34. A bag machine having, in combination, folding means and cutting means operable to form a tubular strip having a transverse flap in one side wall and an alined opening in the opposite wall, of means for folding and securing said flap against said opposite wall including a pair of rolls, a transverse finger carried by one of said rolls, and a recess in the other one of said rolls for receiving said finger.

35. A bag machine having, in combination, folding means and cutting means operable to form a tubular strip having a transverse flap in one side wall and an alined opening in the opposite wall, of means for folding and securing said flap against said opposite wall including a pair of rolls, a transverse finger carried by one of said rolls, and a recess in the other one of said rolls for receiving said finger, one wall of said recess having a plate therein arranged to be engaged by the finger to form a score at the base of the flap.

36. A bag machine having, in combination with folding means and cutting means operable to form a tubular strip having a transverse flap in one side wall of the alined opening in the opposite wall, of means for folding and securing said flap against said opposite wall including a pair of rolls, a transverse finger carried by one of said rolls, and a recess in the other one of said rolls for receiving said finger, means for applying adhesive to the strip adjacent the flap, and means for folding the flap against the strip into contact with the adhesive.

37. A machine for forming bags comprising scoring means, folding means and flap-cutting means, said several means operating in a predetermined sequence to provide a tubular strip with opposite bellows-folds a transverse score and a pair of triangular scores having their bases coinciding with said transverse score, and a pair of flaps in opposite side walls of the strip hinged on axes spaced from but parallel to said transverse score; adhesive applying means, and means for folding said flaps through the openings formed thereby, one of said flaps passing also through the opening formed by the other flap and into engagement with the opposite side wall of the strip and into contact with adhesive applied by said adhesive applying means.

38. A machine for making paper bags in connected end to end relation comprising, in combination, folding means and cutting means operating to form a tubular strip having a flap in one wall thereof and an alined opening in the opposite wall thereof whereby to form simultaneously the open end of one bag in the operation of forming the bottom of an adjacent bag, said flap and opening being of a length less than the width of the strip, and means for folding said flap through said opening into engagement with the opposite side wall.

39. A machine for making paper bags in connected end to end relation comprising, in combination, folding means and cutting means operating to form a tubular strip having opposed bellows-folds and a flap in one wall thereof and an alined opening in the opposite wall thereof whereby to form simultaneously the open end of one bag in the operation of forming the bottom of an adjacent bag, and means for folding said flap through said opening into engagement with the opposite side wall, said flap and said opening being of a length less than the width of the strip whereby to form connecting links between adjacent bags at the opposite edges of the strip.

40. A machine for making paper bags in connected end to end relation comprising, in combination, folding means and cutting means operating to form a tubular strip having a flap in one wall thereof and an alined opening in the opposite wall thereof whereby to form simultaneously the open end of one bag in the operation of forming the bottom of an adjacent bag, means for folding said flap through said opening into engagement with the opposite side wall, said flap and said opening being of a length less than the width of the strip whereby to form connecting links between adjacent bags at the opposite edges of the strip, and means for scoring said links transversely thereof.

41. A machine for making paper bags in connected end to end relation comprising, in combination, folding means and cutting means operating to form a tubular strip having a flap in one wall thereof and an alined opening in the opposite wall thereof whereby to form simultaneously the open end of one bag in the operation of forming the bottom of an adjacent bag, means for folding said flap through said opening into engagement with the opposite side wall, said flap and said opening being of a length less than the width of the strip whereby to form connecting links between adjacent bags at the opposite edges of the strip, and means for scoring said links transversely thereof alternately in opposite directions to effect the stacking of the bags one upon the other.

42. The method of making a paper bag which consists in cutting a flap substantially centrally of a sheet, folding the sheet into a tubular strip with said flap in one side wall thereof, forming a second flap through the opening made in cutting the first flap, folding both flaps against the side wall of the strip opposite that containing the first flap, and finally securing the flaps in position.

43. The method of making a paper bag which comprises folding and cutting a sheet to produce a tubular strip having a flap in one wall and an alined opening in the opposite wall, folding said flap through said opening, and securing the flap to the opposite wall as by means of adhesive.

44. The method of making a paper bag which consists in folding and cutting a sheet to produce a flat tubular strip having opposed bellows-folds and opposed side walls with a flap in one wall and an alined opening in the other wall through which said flap may pass, tucking said flap through the opening, and securing the flap in position upon the opposite side wall as by means of adhesive.

45. The method of making a paper bag which comprises scoring, folding and cutting a sheet in a prearranged sequence of operations to produce a tubular strip having opposite bellows-folds constituting end walls, and side walls having alined openings therein with a flap hinged at one edge of each of said openings, and fastening the flaps together as by adhesive.

46. The method of making paper bags which comprises folding and cutting operations occurring in a predetermined sequence to produce a tubular strip having opposed side walls with alined openings therein of a length less than the width of the strip whereby to form connecting links at the opposite ends of the strip, and forming the bottom of the bag by means of a flap hinged at one edge of one of said openings and folded through the other opening into engagement with the opposite side wall.

In testimony whereof, I have hereunto affixed my signature.

JAMES M. SULLIVAN.